(12) United States Patent
Coan

(10) Patent No.: US 6,987,950 B2
(45) Date of Patent: Jan. 17, 2006

(54) RADIO WITH DUPLEXER BYPASS CAPABILITY

(75) Inventor: Philip David Coan, San Diego, CA (US)

(73) Assignee: Qualcomm, Incorporated, San Diego, CA (US)

(*) Notice: Subject to any disclaimer, the term of this patent is extended or adjusted under 35 U.S.C. 154(b) by 173 days.

(21) Appl. No.: 10/206,551

(22) Filed: Jul. 25, 2002

(65) Prior Publication Data

US 2004/0018819 A1 Jan. 29, 2004

(51) Int. Cl.
*H04B 1/44* (2006.01)

(52) U.S. Cl. .......................................... 455/78; 333/101
(58) Field of Classification Search ................... 455/78, 455/82, 83, 552.1; 333/101, 103
See application file for complete search history.

(56) References Cited

U.S. PATENT DOCUMENTS

| | | | |
|---|---|---|---|
| 5,778,306 A | * | 7/1998 | Kommrusch .................. 455/78 |
| 5,915,212 A | | 6/1999 | Przelomiec et al. |
| 6,351,628 B1 | | 2/2002 | Leizerovich et al. |

* cited by examiner

*Primary Examiner*—Lee Nguyen
(74) *Attorney, Agent, or Firm*—Philip Wadsworth; Sandra L. Godsey; Kent D. Baker

(57) ABSTRACT

Systems and techniques are disclosed relating to a radio with duplexer bypass capability. The radio includes an antenna, a duplexer, a receiver; and a switching circuit configured to switch the antenna between the duplexer and the receiver. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

22 Claims, 3 Drawing Sheets

RADIO WITH DUPLEXER BYPASS CAPABILITY

BACKGROUND

1. Field

The present invention relates generally to communications systems, and more specifically, to a radio with duplexer bypass capability.

2. Background

Radio refers to a system of communications employing electromagnetic waves propagated through free space. Radio is commonly used as a public medium to send commercial broadcasts from a radio transmitter to anyone with a radio receiver. However, radio can also be used as a private medium. Cellular and cordless telephones are common examples of radio transceivers, which are devices that can both transmit and receive signals.

Many radio transceivers are designed for full duplex operation. Full duplex refers to the transmission of signals in two directions simultaneously. By way of example, cellular and cordless telephones are typically a full duplex device because both users can speak at once. In contrast, a walkie-talkie is a half duplex device because only one user can transmit at a time. Full duplex operation is generally supported with a duplexer connecting both the receiver and transmitter to a single antenna. The problem with this approach is that the duplexer introduces loss into the signal directed to the receiver. This loss tends to reduce the noise figure performance of the receiver, and as a result, limits the data rate of the signal that can be detected by the receiver. Accordingly, there is a need in the art for a methodology which allows full duplex operation without significantly degrading the noise figure of the receiver.

SUMMARY

In one aspect of the present invention, an apparatus includes an antenna, a duplexer, a receiver, and a switching circuit configured to switch the antenna between the duplexer and the receiver.

In another aspect of the present invention, an apparatus includes an antenna, a duplexer, a receiver, and means for switching the antenna between the duplexer and the receiver.

In yet another aspect of the present invention, a method of communications includes coupling an antenna to a transmitter and receiver through a duplexer in a first mode, and bypassing the duplexer by coupling the antenna to the receiver in a second mode.

In a further aspect of the present invention, an apparatus includes a processor, and a radio having an antenna, a duplexer, a receiver, and a switching circuit configured to switch the antenna between the duplexer and the receiver under control of the processor.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

An exemplary full duplex radio transceiver includes a transmitter and receiver coupled to a single antenna through a duplexer. The duplexer prevents transmitter leakage from desensitizing or damaging the receiver while at the same time ensures weak signals received by the antenna are directed to the receiver. A switching circuit can be used to bypass the duplexer by connecting the antenna directly to the receiver when the transmitter is inactive. This approach tends to improve the noise figure performance of the receiver by avoiding losses that might otherwise be introduced into the signal by the duplexer.

Figure 1:
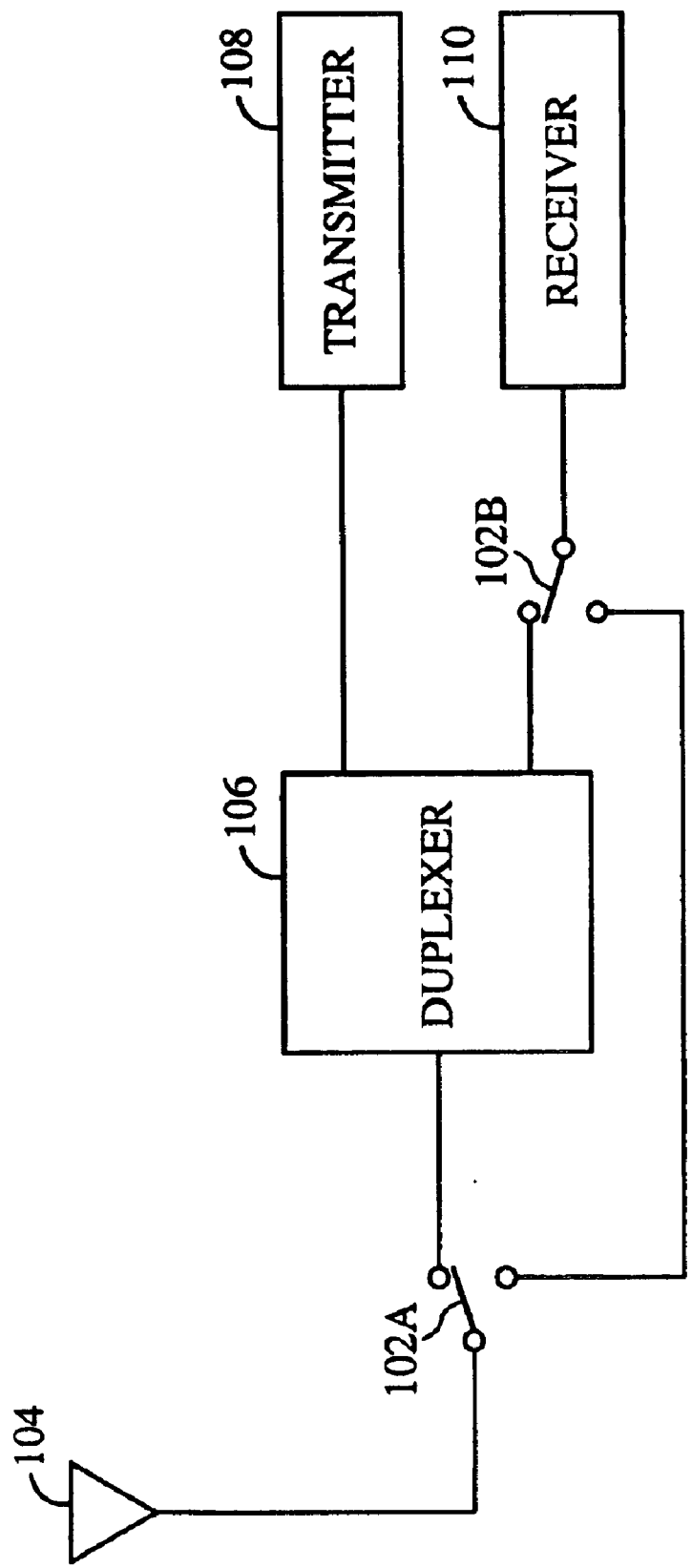
FIG. 1 is a functional block diagram of an exemplary radio transceiver with duplexer bypass capability.

A full duplex radio transceiver with duplexer bypass capability can be implemented in a variety of fashions depending on the overall design constraints of any particular application. FIG. 1 is a functional block diagram of one exemplary embodiment. A switching circuit comprising a pair of SPDT (single-pole-double-throw) switches 102a and 102b can be used to switch between a full duplex mode and a receive only mode. In the full duplex mode, an antenna 104 can be coupled to an antenna port at the front end of a duplexer 106 through a first switch 102a. The back end of the duplexer 106 has a transmit port which can be coupled directly to a transmitter 108, and a receive port which can be coupled to a receiver 110 through a second switch 102b. The switches 102a and 102b can be any switches known in the art. By way of example, high intercept point microwave switches with good linearity can be used to reduce out of band emissions during high power transmissions. In the receive only mode, the switches 102a and 102b can be used to bypass the duplexer 106 by switching the antenna 104 around the duplexer 106 to the input of the receiver 110.

Figure 2:
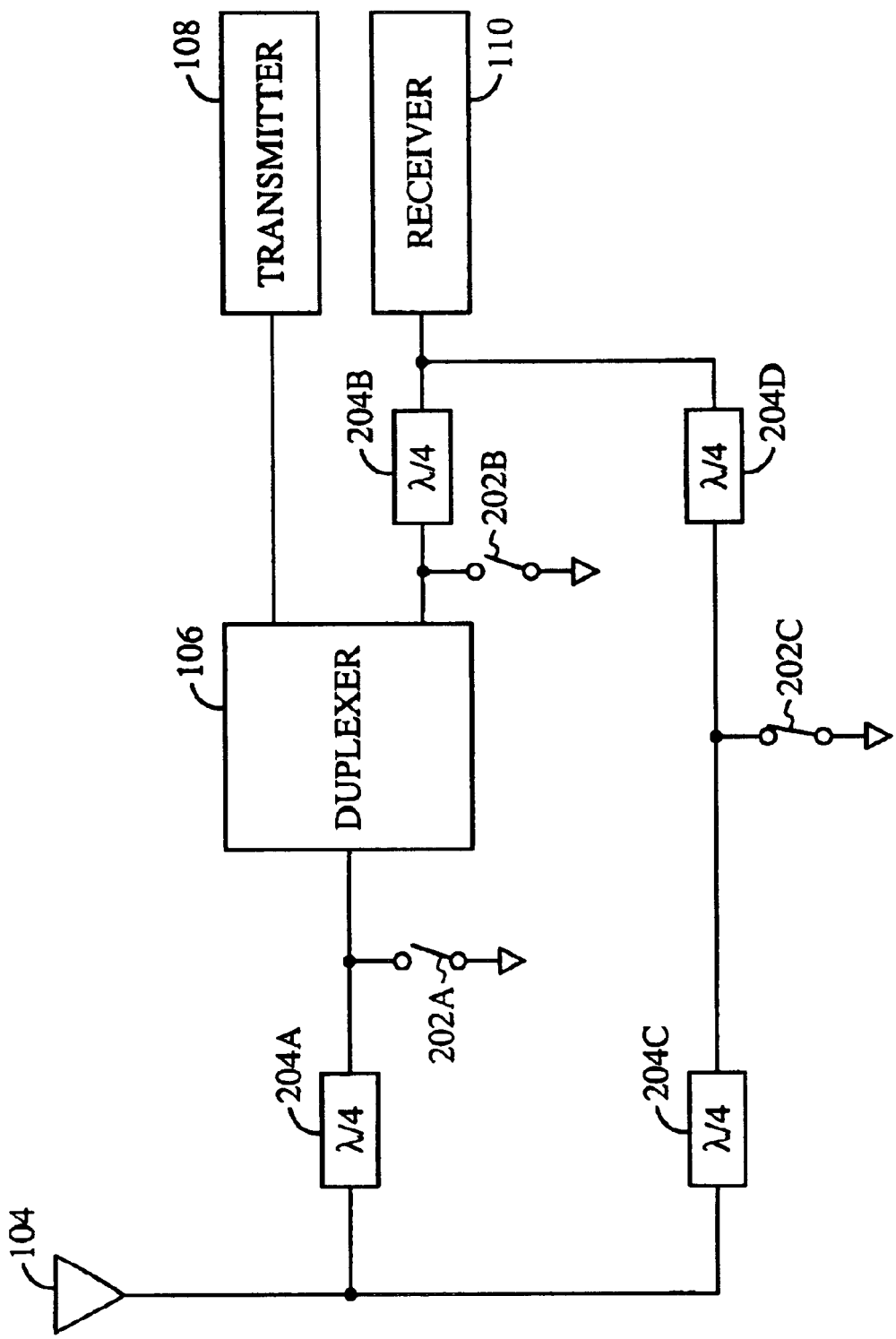
FIG. 2 is a functional block diagram of an alternative exemplary radio transceiver with duplexer bypass capability.

FIG. 2 is a functional block diagram of an alternative embodiment of the full duplex transceiver with duplexer bypass capability. In this example, a switching circuit is implemented with three SPST (single-pole-single-throw) switches 202a–c in conjunction with four one-quarter wavelength transmission lines 204a–d. With this approach, the switches are removed from the signal path. As a result, the signal is not impacted by the loss of each switch. In addition, any non-linearity in the switches does not impact performance. Referring to FIG. 2, a first transmission line 204*a* can be disposed between the antenna 104 and the antenna port of the duplexer 106. A second transmission line 204*b* can be disposed between the receive port of the duplexer 106 and the receiver 110. A first switch 202*a* can be disposed between the antenna port of the duplexer 106 and ground, and a second switch 202*b* can be disposed between the receive port of the duplexer 106 and ground. A bypass path between the antenna 104 and the receiver 110 can be created with the remaining two transmission lines 204*c* and 204*d*. A third switch 202*c* to ground can be connected between the two transmission lines 204*c* and 204*d*.

In the full duplex mode, the first and second switches 202*a* and 202*b* are opened and the third switch 202*c* is closed. With the first and second switches 202*a* and 202*b* opened, both the transmitter 108 and receiver 110 are coupled to the antenna 104 through the duplexer 106. By closing the third switch 202*c*, the bypass path is disabled.

In the receive only mode, the first and second switches 102*a* and 102*b* are closed and the third switch is open. As a result of the first switch 202*a* being closed, the antenna port is shorted to ground disconnecting the antenna 104 from the duplexer 106. By closing the second switch 202*b*, the receiver port is shorted to ground disconnecting the receiver 110 from the duplexer 106. With the third switch 202*c* opened, the antenna 104 is coupled directly to the input of the receiver 110 through the transmission lines 204*c* and 204*d*. The transmission lines can be any transmission lines known in the art. By way of example, guided mode transmission lines can be used to minimize signal loss. The losses associated with the transmission lines 204*c* and 204*d* in the bypass path should be less than the loss introduced by the duplexer 106 between the antenna and receive ports to obtain any improvement in the noise figure performance of the receiver.

The concept of a full duplex transceiver with duplexer bypass capability has unlimited applications. The transceiver can be combined with a processor to support virtually any radio application requiring full duplex capability. By way of example, in wireless telephone applications supporting voice communications, the full duplex mode can be enabled only when the user's voice is being transmitted. This approach ensures that the wireless telephone can always receive voice communications whether the user is speaking or not. The same principle can be applied to full duplex data communications such as modem or fax applications. Specifically, the full duplex mode can be enabled when data is being transmitted, and the receive only mode can be enabled when no data is being transmitted. This concept can be extended to applications supporting both voice and data. The transceiver can be configured to operate in the full duplex mode for both voice and data calls, or can be adaptively switched to the receive only mode when no voice or data is be transmitted.

Figure 3:
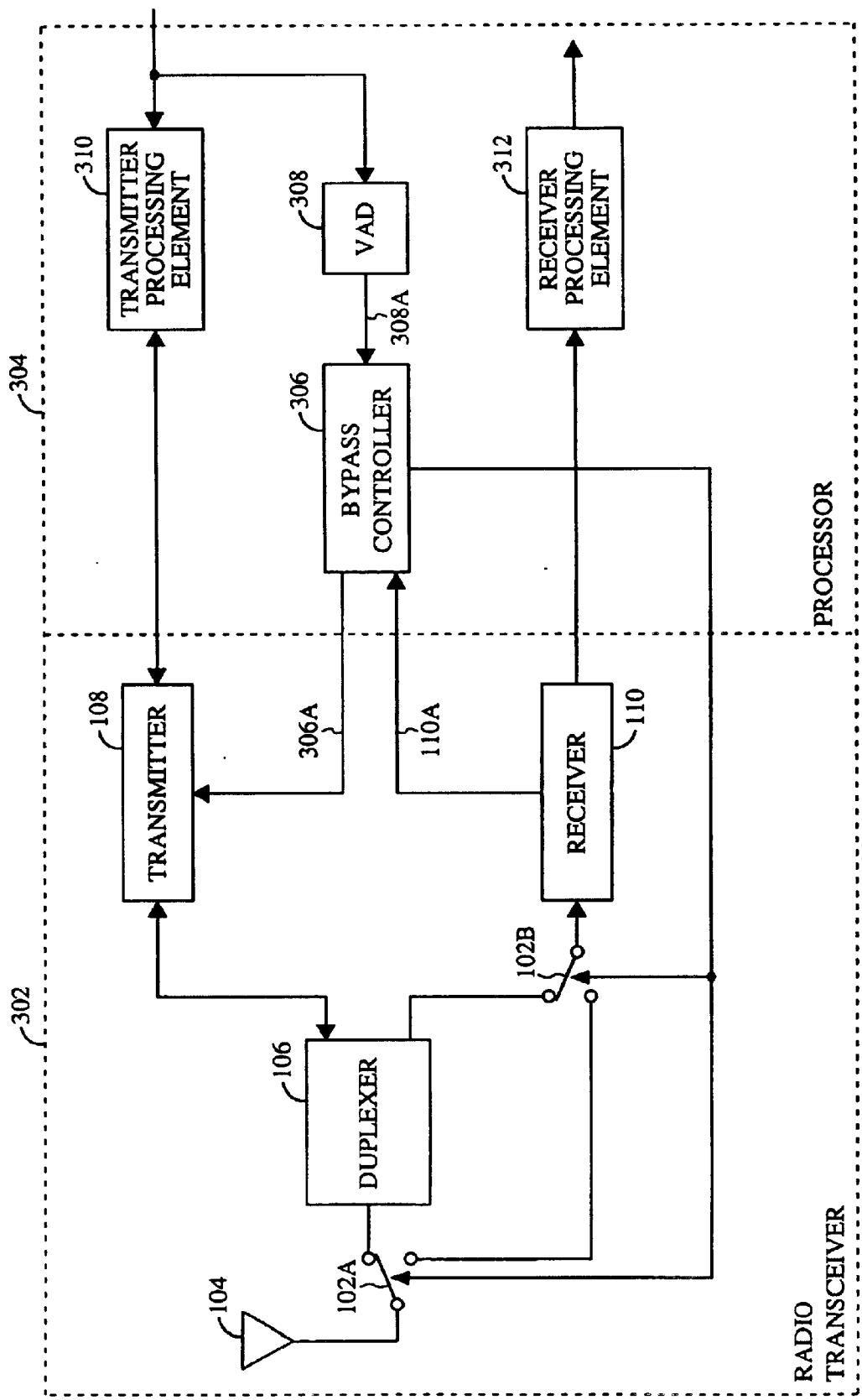
FIG. 3 is a functional block diagram of an exemplary communications device employing a radio transceiver with duplexer bypass capability in combination with a processor.

An exemplary communications device employing this technology is shown in the functional block diagram of FIG. 3. The communications device includes a radio transceiver 302 coupled to a processor 304. The transceiver 302 includes a switching circuit to switch the antenna 104 between the duplexer 106 and the receiver 110. The processor includes a bypass controller 306 which can be used to cause the switching circuit to switch the transceiver 302 between the full duplex mode and the receive only mode. For the purposes of explanation, the transceiver will be described with a switching circuit utilizing a pair of SPDT switches as shown in FIG. 1. However, as those skilled in the art will readily appreciate, the switching circuit can be implemented with any arrangement of switches, transmission lines, or other components.

In the full duplex mode, the bypass controller 306 connects the antenna 104 to the antenna port of the duplexer 106 through the first switch 102*a*, and the receiver 110 to the receive port of the duplexer 106 through the second switch 102*b*. In the receive only mode, the bypass controller 306 switches the antenna 104 around the duplexer 106 to the input of the receiver through the switches 102*a* and 102*b*.

In wireless telephone applications, a voice activity detector (VAD) 308 can be used to determine whether the user is speaking. If the VAD 308 detects speech, a flag 308*a* can be set causing the bypass controller 306 to set the transceiver 302 into the full duplex mode when the transmitter 108 is transmitting voice. In this mode, the speech from the user is digitized and provided to a transmitter processing element 310. The transmitter processing element 310 can be configured to support one or more voice compression algorithms known in the art. The compressed voice samples can then be encoded to provide forward error correction capability and modulated using QPSK (Quadrature Phase Shift Keying), 8-PSK, 16-QAM (Quadrature Amplitude Modulation), or any other modulation scheme known in the art. The modulated voice samples can then be provided to the transmitter 108 in the transceiver 302 for upconversion, filtering and amplification before being provided to the antenna 104 through the duplexer 106.

In the full duplex mode, it is possible that both users may be speaking at once. In that case, the signal received by the antenna 104 can be coupled to the receiver 110 through the duplexer 106. The receiver 110 amplifies, filters and down-converts the signal to baseband. The baseband signal can then be provided to a receiver processing element 312 where it can be digitized, demodulated, decoded and decompressed.

Conversely, when the VAD 308 detects silent periods, the flag 308*a* can be cleared causing the bypass controller 306 to set the transceiver 302 into the receive only mode. In the receive only mode, the signal from the antenna 104 will be directed around the duplexer 106 to the input of the receiver 110. Normally, the transmitter 108 will not be delivering power from its output in the receive only mode. The transmitter 108 may be disabled during the receive only mode with a control signal 306*a* generated by the bypass controller 306, or alternatively, may rely on an isolator (not shown) to protect its circuitry.

When the duplexer 106 is bypassed, the receiver loses any signal rejection capability provided by the duplexer 106. This loss could impact the overall performance of the receiver 110 operating in the presence of one or more jammers. A filter (not shown) can be inserted in the bypass path to increase the signal rejection capability of the receiver 110 in the receive only mode. However, a filter will introduce loss thereby reducing the benefits of the duplexer bypass. If the receiver 110 has a received signal strength indicator (RSSI), a RSSI signal 110*a* can be used by the bypass controller 306 to determine if the performance of the transceiver is better with the duplexer bypassed. The antenna 104 can then be adaptively switched between the duplexer 106 and the receiver 110 to optimize performance.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, comprising:
    an antenna;
    a receiver;
    a duplexer having an antenna port coupled to the antenna and a receiver port coupled to the receiver;
    a bypass path between the antenna and the receiver; and
    a switching circuit configured to switch the antenna between the duplexer and the receiver, the switching circuit being further configured to couple the receiver to the duplexer when the antenna is switched to the duplexer, and to disconnect the receiver from the duplexer when the antenna is switched to the receiver, the switching circuit comprising,
        a bypass switch between the bypass path and ground,
        an antenna switch between the antenna port and the ground,
        a receiver switch between the receiver port and the ground,
        a first transmission line between the antenna and the antenna port,
        a second transmission line between the receiver and the receiver port,
        a third transmission line in the bypass path having a first end coupled to the antenna and a second end, and
        a fourth transmission line in the bypass path having a first end coupled to the receiver and a second end coupled to the second end of the third transmission line,
    wherein the bypass switch is connected between the second ends of the third and fourth transmission lines and the ground.

2. A method of communications, comprising:
    coupling an antenna to a transmitter and receiver through a duplexer in a first mode by grounding a bypass path between the antenna and the receiver, the duplexer comprising an antenna port coupled to the antenna and a receiver port coupled to the receiver; and
    bypassing the duplexer in a second mode by coupling the antenna to the receiver and disconnecting the receiver from the duplexer, the antenna being coupled to the receiver by grounding the antenna port of the duplexer and the receiver being disconnected from the duplexer by grounding the receiver port of the duplexer;
    wherein the bypassing of the duplexer further comprises isolating the grounded antenna port from the antenna through a first transmission line and isolating the grounded receiver port from the receiver through a second transmission line; and
    wherein the coupling of the antenna to the transmitter and the receiver through the duplexer further comprises isolating the grounded bypass path from the antenna through a third transmission line and isolating the grounded bypass path from the receiver through a fourth transmission line.

3. An apparatus, comprising:
    a duplexer having an antenna port and a receiver port;
    an antenna coupled to the antenna port of the duplexer,
    a receiver coupled to the receiver port of the duplexer, and to the antenna through a bypass path;
    a bypass switch configured to apply ground to the bypass path in a first switch position and remove ground from the bypass path in a second switch position; and
    an antenna switch configured to apply ground to the antenna port in a first switch position and remove ground from the antenna port in a second switch position.

4. The apparatus of claim 3 wherein the duplexer further comprises a transmitter port, the apparatus further comprising a transmitter coupled to the transmitter port of the duplexer.

5. The apparatus of claim 3 further comprising a first transmission line between the antenna and the bypass switch, and a second transmission line between the receiver and the bypass switch.

6. The apparatus of claim 5 wherein the transmission lines are each one-quarter wavelength transmission lines.

7. The apparatus of claim 3 further comprising a processor configured to control the switches such that the bypass switch is in the first switch position at the same time the antenna switch is in the second switch position, or the bypass switch is in the second switch position at the same time and the antenna switch is in the first switch position.

8. The apparatus of claim 7 further comprising a first transmission line between the antenna and the bypass switch, a second transmission line between the receiver and the bypass switch, and a third transmission line between the antenna and the antenna port of the duplexer.

9. The apparatus of claim 8 wherein the transmission lines are each one-quarter wavelength transmission lines.

10. The apparatus of claim 3 further comprising a receiver switch configured to apply ground to the receiver port in a first switch position and remove ground from the receiver port in a second switch position.

11. The apparatus of claim 10 further comprising a processor configured to control the switches such that the bypass switch is in the first switch position at the same time the antenna and receiver switches are in the second switch position, or the bypass switch is in the second switch position at the same time and the antenna and receiver switches are in the first switch position.

12. The apparatus of claim 11 further comprising a first transmission line between the antenna and the bypass switch, a second transmission line between the receiver and the bypass switch, a third transmission line between the antenna and the antenna port of the duplexer, and a fourth transmission line between the receiver and the receiver port of the duplexer.

13. The apparatus of claim 12 wherein the transmission lines are each one-quarter wavelength transmission lines.

14. A method of communications, comprising:
coupling an antenna to a receiver through a duplexer by applying ground to a bypass path between the antenna and receiver; and
bypassing the duplexer by coupling the antenna to the receiver through the bypass path by removing the ground from the bypass path, wherein the duplexer comprises an antenna port coupled to the antenna, and wherein the duplexer is bypassed by applying the ground to the antenna port and the antenna is coupled to the receiver through the duplexer by removing the ground from the antenna port.

15. The method of claim 14 wherein the antenna is coupled to a transmitter through the duplexer when the ground is applied to the bypass path.

16. The method of claim 14 wherein the ground is applied to and removed from the bypass path through a bypass switch, the method further comprising isolating the antenna from the bypass switch through a first transmission line, and isolating the receiver from the bypass switch through a second transmission line.

17. The method of claim 16 wherein the transmission lines are each one-quarter wavelength transmission lines.

18. The method of claim 14 wherein the ground is applied to and removed from the bypass path through a bypass switch, and the ground is applied to and removed from the antenna port through an antenna switch, the method further comprising isolating the antenna from the bypass switch through a first transmission line, isolating the receiver from the bypass switch through a second transmission line, and isolating the antenna from the antenna switch through a third transmission line.

19. The method of claim 18 wherein the transmission lines are each one-quarter wavelength transmission lines.

20. The method of claim 14 wherein the duplexer comprises a receiver port coupled to the receiver, and wherein the duplexer is bypassed by applying the ground to the receiver port, and wherein the antenna is coupled to the receiver through the duplexer by removing the ground from the receiver port.

21. The method of claim 20 the ground is applied to and removed from the bypass path through a bypass switch, the ground is applied to and removed from the antenna port through an antenna switch, and the ground is applied to and removed from the receiver port through a receiver switch, the method further comprising isolating the antenna from the bypass switch through a first transmission line, isolating the receiver from the bypass switch through a second transmission line, and isolating the antenna from the antenna switch through a third transmission line, and isolating the receiver from the receiver switch through a fourth transmission line.

22. The apparatus of claim 21 wherein the transmission lines are each one-quarter wavelength transmission lines.

* * * * *